United States Patent
Kurian

(10) Patent No.: US 10,819,746 B2
(45) Date of Patent: Oct. 27, 2020

(54) NODES ON AN INTERNET OF THINGS ("IOT") WITH DUAL-NETWORK ACCESS PORTS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 15/928,073

(22) Filed: Mar. 21, 2018

(65) Prior Publication Data

US 2019/0297111 A1    Sep. 26, 2019

(51) Int. Cl.
  *H04L 29/06* (2006.01)
  *H04L 29/08* (2006.01)
  *H04L 12/851* (2013.01)

(52) U.S. Cl.
  CPC .......... *H04L 63/18* (2013.01); *H04L 47/2441* (2013.01); *H04L 63/0428* (2013.01); *H04L 67/12* (2013.01)

(58) Field of Classification Search
  CPC ..... H04L 63/00; H04L 63/18; H04L 47/2441; H04L 63/0428; H04L 67/12; H04W 4/70; H04W 12/00
  See application file for complete search history.

(56) References Cited

U.S. PATENT DOCUMENTS

| | | |
|---|---|---|
| 9,319,404 B2 | 4/2016 | Svigals |
| 9,485,231 B1 | 11/2016 | Reese |
| 9,565,192 B2 | 2/2017 | Chillappa et al. |
| 9,591,016 B1 | 3/2017 | Palmieri et al. |
| 9,699,659 B2 | 7/2017 | Zehavi et al. |
| 9,699,814 B2 | 7/2017 | Zakaria et al. |
| 9,716,595 B1 | 7/2017 | Kravitz et al. |
| 9,729,528 B2 | 8/2017 | Zakaria et al. |
| 9,825,921 B2 | 11/2017 | Reese |
| 9,875,510 B1 | 1/2018 | Kasper |

(Continued)

OTHER PUBLICATIONS

"Securing the Internet of Things: A Proposed Framework," https://www.cisco.com/e/en/us/abottt/security-center/secure-iot-proposed-framework.html Mar. 16, 2016.

(Continued)

*Primary Examiner* — Shanto Abedin
(74) *Attorney, Agent, or Firm* — Weiss & Arons LLP; Michael A. Springs, Esq.

(57) ABSTRACT

Apparatus and methods are provided for improving the security and transmission of data carried by an Internet of Things ("IOT") network. Each node on the IoT network may include a pass-through network access port and a dedicated network access port. The dedicated network access port may be used by the node intermittently to transmit/receive a first class of data. The pass-through network access port may be used continuous by the node to transmit/receive a second class of data. The dedicated network access port may transmit/receive data using a first transmission channel that is physically or virtually isolated from a second transmission channel that is used by the pass-through network access port. Providing isolated transmission channels may improve the security of data transmitting using the dedicated network access port.

18 Claims, 7 Drawing Sheets

(56) References Cited

U.S. PATENT DOCUMENTS

| | | | |
|---|---|---|---|
| 10,251,053 B1 | 4/2019 | Paczkowski | |
| 2005/0288050 A1* | 12/2005 | Gill | H04W 72/005 455/518 |
| 2008/0239961 A1* | 10/2008 | Hilerio | H04L 45/306 370/235 |
| 2009/0132691 A1* | 5/2009 | Daurensan | H04L 41/0896 709/223 |
| 2012/0054296 A1* | 3/2012 | Chaudhry | H04L 63/10 709/213 |
| 2013/0300343 A1* | 11/2013 | Files | H01M 10/44 320/103 |
| 2014/0105221 A1* | 4/2014 | Bailey | H04L 65/1069 370/420 |
| 2014/0325021 A1* | 10/2014 | Jenkins | H04L 67/14 709/217 |
| 2016/0094071 A1* | 3/2016 | Nge | H02J 7/00 320/107 |
| 2016/0173495 A1 | 6/2016 | Joo | |
| 2016/0248746 A1 | 8/2016 | James et al. | |
| 2016/0249368 A1* | 8/2016 | Sadiq | H04W 72/085 |
| 2016/0259937 A1 | 9/2016 | Ford et al. | |
| 2016/0260095 A1 | 9/2016 | Ford | |
| 2016/0337127 A1 | 11/2016 | Schultz et al. | |
| 2016/0352685 A1* | 12/2016 | Park | H04L 63/1416 |
| 2016/0366181 A1 | 12/2016 | Smith et al. | |
| 2017/0163444 A1 | 6/2017 | McLaughlin et al. | |
| 2017/0289184 A1 | 10/2017 | C et al. | |
| 2018/0054376 A1* | 2/2018 | Hershey | H04L 67/1002 |
| 2018/0198641 A1* | 7/2018 | Gilani | H04L 12/66 |
| 2018/0253451 A1 | 9/2018 | Callan et al. | |
| 2019/0172566 A1 | 6/2019 | Schulman et al. | |
| 2019/0230032 A1* | 7/2019 | Landau | H04L 65/102 |
| 2019/0289454 A1 | 9/2019 | Inoue | |
| 2019/0349190 A1 | 11/2019 | Smith et al. | |

OTHER PUBLICATIONS

Warwick Ashford, "Global Hacker Botnet tops 6 million hijacked devices," http://www.computerweekly.com/news/450427023/Global-hacker-botnet-tops-6-million-hijacked-devices Sep. 27, 2017.

Bradley Mitchell, "An Overview of Network Adapters," https://www.lifewire.com/definition-of-adapter-817585, Jun. 10, 2017.

"Network Hardware & Assembly: LAN 102," http://www.tomsitpro.com/articles/local_area_network-gigabit_ethernet-networking-nics-scott_mueller.2-263.html, Mar. 5, 2012.

"Network Interface Controller," https://en.wikipedia.org/wiki/Network_interface_controller, Wikimedia Foundation, Inc., Feb. 27, 2018.

Conoscenti et al., "Peer to Peer for Privacy and Decentralized in the Internet of Things," 2017, IEEE, pp. 288-290. (Year: 2017).

\* cited by examiner

NODES ON AN INTERNET OF THINGS ("IOT") WITH DUAL-NETWORK ACCESS PORTS

FIELD OF TECHNOLOGY

This disclosure relates to improving transmission and security of data on an Internet of Things ("IoT") network. Specifically, this disclosure relates to forming an IoT using nodes having at least two network access ports.

BACKGROUND

An IoT may be defined as "a pervasive and ubiquitous network which enables monitoring and control of the physical environment by collecting, processing, and analyzing the data generated by sensors or smart objects." Securing the Internet of Things: A Proposed Framework, Jazib Frahim, Carlos Pignataro, Jeff Apcar and Monique Morrow, Published by Cisco Security Research & Operations and available at: https://www.cisco.com/c/en/us/about/security-center/secure-iot-proposed-framework.html.

Examples of such sensors or nodes include refrigerators, lights, smartphones, smartwatches, computers, laptops, tablets, sinks, hot water heaters, coffee machines, ovens, vehicles, thermostats and any other suitable devices.

The diverse nature and large volume of data collected by numerous interconnected nodes on an IoT potentially enables unique functionality and operational opportunities. Interconnected nodes may gather data. Computing systems may process the gathered data and derive new knowledge or insights from the gathered data. The new knowledge may be leveraged to provide feedback to the nodes or instructions to other nodes. Such feedback improves operational efficiency and intelligence of the nodes. Exemplary effects of improved operational efficiency and intelligence may be recognized by optimizing processes, improving understanding and targeting of customer needs, increasing automation and decreasing latency when providing products and/or services.

In an IoT, each of the inter-connected nodes may not have uniform data transmission capabilities, data transmission needs, known network positions, known communication protocols or sufficient resources to provide security services. Furthermore, IoT connected nodes may not be centrally controlled. Accordingly, it may be technically challenging to leverage IoT connected nodes for transmission of sensitive information or other applications that require a threshold level of security or performance. Sensitive information may include personally identifiable information or financial information.

To solve these technical challenges, it would be desireable to provide technical solutions that allow interconnected IoT nodes to transmit data seamlessly and securely and thereby leverage the distributed efficiency and intelligence capabilities provided by an IoT. Accordingly, it would be desirable to provide apparatus and methods that improve and secure data transmission capabilities of nodes connected to an IoT.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
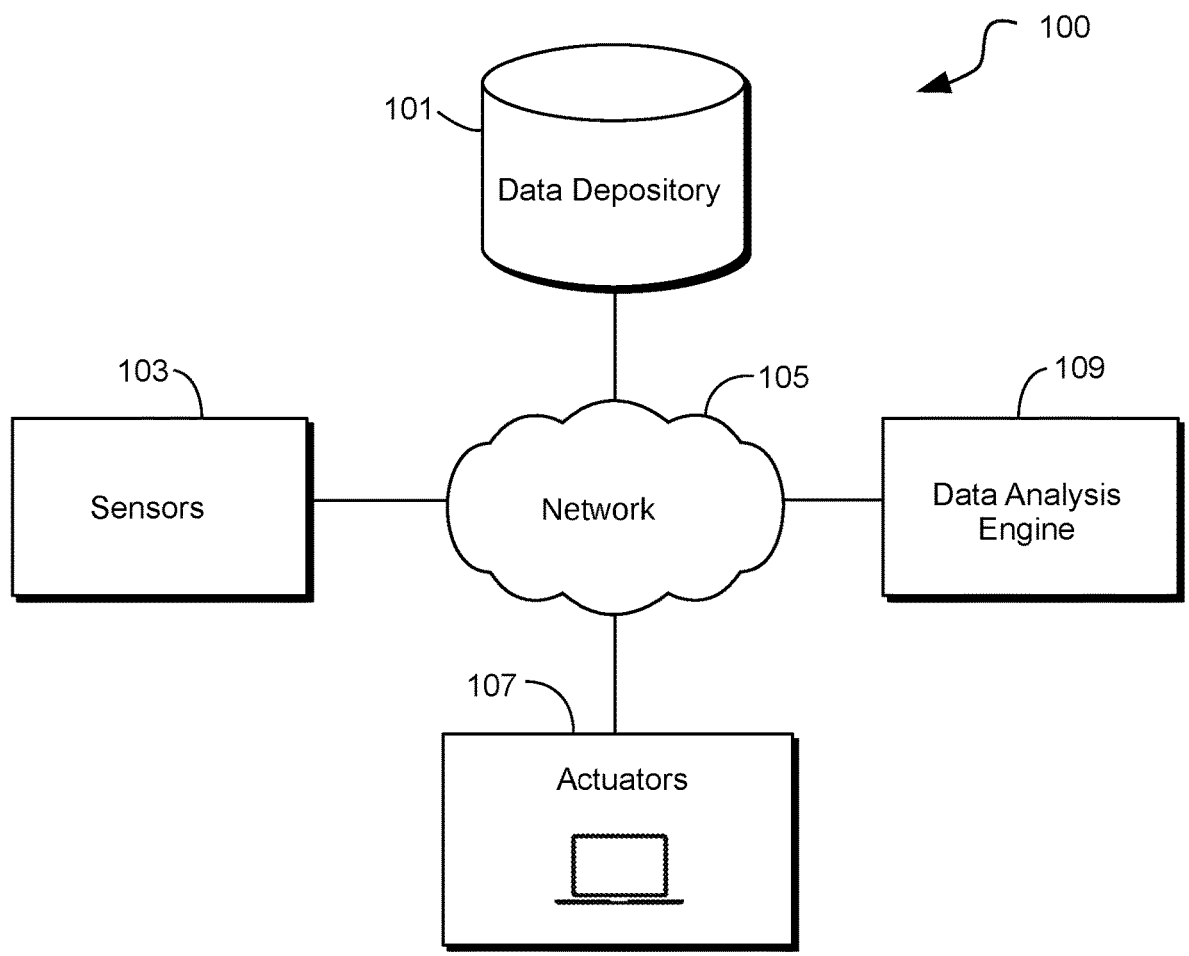
FIG. 1 shows an illustrative system architecture in accordance with principles of the disclosure.

Apparatus and methods for improving the flow of information through an IoT network are provided. Apparatus may include a network node. The node may include a network access port. A network access port may transmit data from the node onto the network. Transmitting data onto the network may include transmitting data to another node. A network access port may receive data from the network node. The data received by a network access port may have been transmitted by another node.

A network access port may receive data transmitted by another node. The received data may be destined for the receiving node. The received data may be destined for another node on the network. A node may receive data destined for another node and relay that data to the other node. Data may be relayed by two or more nodes until the data reaches its final destination.

A network access port may be a hardware device that enables a node to transmit and/or receive data on an IoT network. For example, a network access port may be a network interface card ("NIC"). A network access port may include software (e.g., a "virtual" network access port) that simulates the functions of a hardware network access port.

A network access port (virtual or hardware) may have any suitable performance attributes. For example, a network access port may support half-duplex or full-duplex operation. Half-duplex access ports may either transmit or receive data, but not both simultaneously. Full-duplex access ports may simultaneously transmit and receive data.

A network access port may be associated with a data transmission speed. Illustrative data transmission speeds include 1000 mega-bytes/second ("Mb") (e.g., gigabit Ethernet), 100 Mb/s or 10 Mb/s. A full-duplex access port may have a transmit data transmission speed and a receive data transmission speed. The transmit data transmission speed may be different from the receive data transmission speed.

A network access port (virtual or hardware based) may be associated with a unique network address. For example, hardware network access ports may include a unique hardware address coded into firmware of the access port. A data link layer service of a network may use the unique address to identify a source/destination network access port for transmitted data. For example, data transmitted over an IoT network may arrive at a correct destination because header information associated with a data-link layer service includes a unique address of the sending access port and a unique address the receiving access port.

The node may include a first network access port. The first network access port may be a dedicated network access port. The node may include a dedicated network access port for receiving and transmitting time-sensitive instructions.

Time-sensitive instructions may be transmitted at discrete intervals. For example, a node may not typically process time-sensitive instructions. Nodes on an IoT may typically operate under an assumption that information they transmit/receive is not time-sensitive. Generally, such an assumption may allow the IoT to regulate overall data flow through the network rather than prioritizing transmission of a specific message. However such an operating assumption does not allow the IoT to prioritize or otherwise optimize transmission of specific messages.

The node may include a second network access port. The second network access port may be a pass-through network access port. The pass-through port may be configured to transmit and/or receive data destined for at least one other node on the IoT. The pass-through port may be utilized by the node to relay data that is not finally destined for the node. The pass-through port may be utilized by the node to relay data finally destined for at least one other node on the network. In some embodiments, the node may read data transmitted/received by the pass-through network access port.

A node may utilize port partitioning techniques to provide a dedicated network access port and a pass-through network access port. Port partitioning techniques may divide a single network access port into two or more discrete network access ports. A node may utilize software to simulate the functions of discrete hardware network access ports (e.g., "virtual" network access ports). A node may use a combination of software and hardware to provide dedicated network access ports and/or pass-through network access ports. Each of a node's discrete network access ports may have its own dedicated bandwidth, transmission speed or other performance attributes.

The dedicated network access port may have a first network address. The pass-through network access port may have a second network address. A network address may be an internet protocol ("IP") address. Time-sensitive messages may be addressed to the network address associated with the dedicated network access port. Addressing a message using the network address of the dedicated network access port may ensure that each node will relay the message (until the message reaches a destination) using a dedicated network access port.

Using a dedicated network access port to relay time-sensitive or other specific messages may improve the transmission of such messages over an IoT network. Improvements in transmission may include reducing latency until the message reaches its final destination. Improvements may include fewer errors in the transmitted/received message.

A dedicated network access port may include hardware that is identical to the pass-through network access port. The dedicated network access port may nonetheless improve the transmission of messages it transmits/receives. For example, the dedicated network access port may not be used to transmit/receive the same quantity of network data as the pass-through network access port. The dedicated network access port may not need to buffer messages (or buffer for less time) before relaying them. A dedicated network access port may apply rigorous error checking algorithms to the messages it relays and still relay those messages to another node faster than it would take the node to relay a message using the pass-through network access port.

In some embodiments, a dedicated network access port may include specialized hardware and/or software. For example, a dedicated network access port may have a first bandwidth capability. The pass-through network access port may have a second bandwidth capability. The first bandwidth capacity may be greater than the second bandwidth capacity. The dedicated network access port may include additional hardware, such as processors, communication circuits and memory that provide the first bandwidth.

In some embodiments, the pass-through network access port may be configured to provide better performance than the dedicated network access port. For example, the pass-through network access port may be used more often and may carry more data than the dedicated network access port. Enhancing performance of the pass-through network access port may allow this port to function better. Enhancing performance of the pass-through network access port may improve data flowing through the IoT network.

The dedicated network access port may be capable of pushing a new message into a data stream carried by the network. For example, when a node originates a new message, the new message may be pushed into a data stream flowing through the network using the dedicated network access port. The pass-through network access port may be read only. For example, a first node may use the pass-through network access port to relay messages received from a second node and destined for a third node. In some embodiments, if a node is a final destination for the message, the node may receive the message using its dedicated network access port.

The dedicated network access port may be configured to receive/transmit messages using a first data transmission channel. The pass-through network access port may be configured to transmit/receive using a second data transmission channel. For example, the first data channel may be a Bluetooth® channel and the second data channel may be a wired channel. The node may not relay messages destined for other nodes unless it is connected to a wired connection.

As a further example, a dedicated network access port may utilize battery power (or another high-cost power resource) to propagate a transmission using the first data transmission channel. Battery power may be used as a result of the priority or sensitivity associated with data transmitted using the dedicated network access port.

The dedicated and pass-through network access ports may be reconfigurable. For example, the pass-through network access port may be configured to push new messages onto the data stream flowing through the network using the second data transmission channel. The pass-through network access port may be configured to push new messages onto the data stream using the first data transmission channel.

The first data transmission channel may be physically isolated from the second data transmission channel. For example, the first and second data transmission channels may be distinct components of a physical layer of the network. The first data transmission channel may be virtually isolated from the second data transmission channel. For example, data transmitted on the first and second data transmission channels may travel on the same physical media and be separated on that media by software/coding algorithms.

The pass-through network access port may be reconfigured in response to obtaining prior authorization from a network gateway on the network. In some embodiments, the node itself may control configuration of its network access ports. Any node on the network may be configured to control configurations of network access ports of another node.

Apparatus for improving the flow of electronic information on an IoT network is provided. The network may include a plurality of nodes. One or more of the nodes may include a dedicated network access port. One or more of the nodes may include a pass-through network access port.

The pass-through network access port may receive data addressed to other nodes on the network. The pass-through network access port may retransmit, or relay, the received data to other nodes on the network.

The dedicated network access port may receive and data addressed to the node. The dedicated network access port may ingest data it receives. Ingested data may be consumed by the node and not retransmitted by the node. The dedicated network access port may transmit data generated by the node.

The pass-through network access port may not allow the node to change or alter data it receives or retransmits using the pass-through network access port. The pass-through network access port may be used solely for relaying data to/from other nodes on the network.

Error checking may be performed by the pass-through network access port. Error checking may be performed by the dedicated network access port. Error checking may include verifying integrity of data received/transmitted by a network access port.

In response to detecting an error in data received by a network access port, the node may formulate a proposed change to the data. The node may submit the proposed change to a network gateway. The node may receive authorization from the network gateway to propagate the proposed change to one or more other nodes on the network. A first node may use its pass-through network access port to receive data. If an error is detected in the data, the node may use its dedicated network access port to transmit a correction or change to the data. The node may use the dedicated network access port to request authorization to propagate the proposed change/correction. The node may use the dedicated network access port to transmit an authorization onto the network and change/correction to a second node.

In response to receiving the proposed change and the authorization, the second node may verify the authorization received from the first node. A valid authorization may trigger use of the second node's dedicated network access port. An authorization may be verified by communicating with a network gateway, the first node, or two or more nodes. In some embodiments, an authorization to accept or transmit a change to data may be sent via a node other than the node proposing the change or the node expected to receive the change. Such a procedure may reduce a likelihood of a Man-In-The-Middle ("MITM") attack.

In response to verifying the authorization, the second node may push the proposed change onto the network via its dedicated network access port. A proposed change may include header information. The header information may ensure that the proposed change, after initially being pushed onto the network, is relayed by other nodes using their pass-through ports network access ports.

In some embodiments, transmission of data addressed to a node's dedicated network access port may be prioritized by the network over data addressed to a node's pass-through network access port. In some embodiments, transmission of data addressed to a node's pass-through network access port may be prioritized by the network over data addressed to a node's dedicated network access port.

Data addressed to a node's dedicated network access port may be encrypted. A transmitting node may perform the encryption. A relaying node may perform the encryption. Data addressed to a node's pass-through port may not be encrypted.

Nodes on the network may only have a pass-through network access port. A node that does not have a dedicated network access port may not transmit a proposed change to data it relays. Nodes on the network may not have a pass-through network access port.

A pass-through network access port may be deactivated (e.g., suspend receiving/transmitting data). A network access port may be deactivated by powering down the network access port. A network access port may be deactivated for any suitable duration of time. A network access port may be cycled on/off. Such cycling may regulate a flow of data on a network. For example, deactivated a pass-through network access port may speed transmission of data carried by a dedicated network access port. Deactivating the pass-through network access port may reduce an amount of data flowing through the network.

Apparatus for improving a flow of electronic information (e.g., data) on an IoT network are provided. The network may include a plurality of nodes. Each node may include a dedicated network access port and a pass-through network access port. The pass-through network access port may receive data addressed to other nodes on the network. The pass-through network access port may retransmit the data received by a node and addressed to other nodes.

The dedicated network access port may receive data addressed to the node. The node may be the final destination for data addressed to the node. The dedicated network access port may not relay data that is destined for another node. The dedicated network access port may transmit data generated by the node. The data generated by the node may be destined for another node. Intervening nodes that relay the generated data may retransmit the data using their respective pass-through network access ports.

A dedicated network access port may be deactivated. Deactivating the dedicated network access port may speed up (e.g., increase the throughput) of data transmitted by the pass-through network access ports. The data flow may be increased as a result of the dedicated network access port suspending transmission/receiving activity when it is deactivated.

A network access port may be partially deactivated. For example, the network access port may receive (and buffer) data but may not transmit the received data. As a further example, the network access port may transmit data but may not receive data.

A network access port may be activated/deactivated by its node. A network access port may be activated/deactivated by a network gateway. In some embodiments, network access port may be activated/deactivated in response to a request by another node. Activating/deactivating network access ports may be centrally controlled. Activating/deactivating network access ports may be controlled by each node. Each node may control its network access ports based on feedback from other nodes and/or monitoring data flow on the network.

A pass-through network access port may be a first pass-through network access port. A node's dedicated network access port may be convertible into a second pass-through network access port. For example, a node may convert its dedicated network access port into a second pass-through access port when the node is connected to a continuous power source. The dedicated network access port may be automatically converted to function as a pass-through access port when the node is connected to a continuous power supply.

When the node is connected to a battery or other limited-duration power supply, the pass-through network access port may not be continuously active. To converse power, a node may activate or deactivate pass-through network access port at periodic time intervals.

A dedicated network access port may be a first dedicated network access port. A pass-through network access port may be convertible into a second dedicated network access port. Activating two dedicated network access ports may reduce transmission latency associated with data addressed to the node. Utilizing two dedicated network access ports may increase a throughput of data that is received by the node. Having two dedicated network access ports may increase an amount of data originated and transmitted by the node.

A dedicated network access port may communicate over a wireless channel. A dedicated network access port may communicate over a wired channel. A pass-through network access port may communicate over a wired channel. A pass-through network access port may communicate over a wireless channel. A node may be a smart phone. A node may be a smart watch.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

FIG. 1 shows illustrative system architecture 100. Architecture 100 may represent an illustrative IoT network. A differentiator between IoT and conventional networks may include a data-traffic profile. In an IoT, nodes may not have defined or known network positions, communication protocols or security services. Solutions that allow architecture 100 to function seamlessly and securely despite functional and operational differences among nodes are disclosed herein.

Architecture 100 may include one or more nodes. Each node may include two or more nodes. FIG. 1 shows exemplary nodes 101, 103, 105, 107 and 109. Nodes 103 are sensors. Nodes 103 may include devices that detect changes in a physical or virtual environment. For example sensors may measure audio, rainfall, temperature, water levels or activity of other sensors. Sensors may measure electronic network traffic, electronic signals (e.g., input or output) or frequency of user logins within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental changes.

Sensors may implement two or more functions. For example, sensors may measure changes in their native (physical or virtual) environment, capture data corresponding to the measured changes and store/communicate the captured data. Sensors may be accessed by other sensors or other network nodes. Sensors may transmit captured data to another node. For example, sensors may broadcast captured data to two or more nodes.

Captured data may be transmitted using any suitable transmission method. For example, data captured by a sensor may be transmitted to a smartphone. Sensors may leverage a communication link provided by a smartphone to communicate captured data to other nodes.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address.

Data captured by a node may be transmitted by the node and processed far from the location where the data was captured. For example, captured data may be transmitted from one node to another node until the captured data reaches data repository 101.

Nodes may be positioned in, and capture data from, diverse locations. Locations may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of, or delivery to, a desired node.

For example, a location where data is captured may not have continuous, reliable network connectivity. Accordingly, captured data may be stored locally on the node until a network connection is available to transmit or broadcast the captured data to another node.

Nodes may be grouped. Nodes may be grouped based on physical proximity or based on the content (or expected content) of data captured by the node. Nodes may be grouped virtually. Other nodes, such as data analysis engine 109 may create and/or be included in such groups. In some embodiments, the captured data may be organized by data repository 101.

Contextually, captured data may provide information not only about the native (physical or virtual) environment surrounding a node, but capturing of data from multiple nodes may provide data that signifies occurrence an event. Detecting the occurrence of the event may trigger nodes to take responsive action.

For example, based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable (e.g., logical) operation.

For example, a node may include one or more of the following hardware components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a node may be linked by a system bus, wirelessly or by other suitable interconnections. Node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Illustrative network connections may include a local area network ("LAN") and a wide area network ("WAN"), and may also include other networks. When used in a LAN networking environment, a node may be connected to the LAN through a network interface or adapter. A node may include a communication circuit. The communication circuit may include the network interface or adapter.

When used in a WAN networking environment, a node may include a modem, antenna or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a display, battery, speaker, and antennas. Network nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

A node may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing" and/or "fog computing").

A node may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that power one or more components of a node.

Nodes of architecture 100 or other grouping may be produced by different manufacturers. Nodes may capture data in different formats. For example, nodes may use different data structures to package captured data. Sensors 103 may utilize different communication protocols to transmit captured data or communicate with other nodes. Despite such operational differences, nodes of architecture 100 may be configured to operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity and/or quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a sensor may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a sensor may respond slowly if the sensor transmits a large amount of captured data. If transmitted all at once, the large amount of information transmitted by the sensor, together with other informational traffic traveling on a shared communication pathway, may be close to, or exceed bandwidth of the communication pathway. As a result, sensors may be unable to transmit time-sensitive captured date in a timely manner.

Based on a cost associated with obtaining or transmitting data, a node may determine whether to employ a pass-through network access port or a dedicated network access port.

Data travelling within architecture 100 to/from nodes may be routed along multiple communication pathways until the transmitted information reaches a desired destination node (e.g., data analysis engine 109). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of data traffic on a particular communication pathway or a bandwidth capacity of a communication pathway.

Furthermore, a communication pathway may be controlled by an entity different from an entity responsible for operation of a particular node. The entity responsible for operation of the node may be unable to monitor a number of nodes that share a communication pathway, a bandwidth capacity of a communication pathway or a volume of data transmitted on a communication pathway. Despite difficult to predict conditions on a communication pathway, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships may enhance access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud, breach of confidentiality), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" or "fog" of computing devices. On-device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware to achieve target functionality. Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. Actuators 107 may move (translate, rotate, etc.) physical objects or activate/deactivate functionalities of physical objects. For example, actuators 107 may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as "eyes" collecting information about their native environment. In contrast, actuators 107 act as "hands" implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators 107.

Generally, nodes on a network may interact and cooperate using one or more interaction paradigms. Exemplary interaction paradigms include client-server and peer-to-peer interactions. However, an IoT may not include express or clearly defined relationships between sensors and the devices that access data captured by the sensors. Therefore, traditional approaches for managing trust, security naming, discovery, or other traditional network services may not be applicable or available.

As a result of the disparate nature of sensors 103, system architectures, such as architecture 100 incorporating sensors 103 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milliwatts ("mW") of power to provide 1 mW transmission power over a range of 10 to 100 meters and a data transmission rate of 250 kilo-bits/second.

To further conserve energy, a sensor may communicate wirelessly for short periods of time. Utilizing this approach, one or more standard size single cell cylindrical dry battery batteries (e.g., AA size) may provide a node with requisite computing power and wireless communication for many months.

Communication protocols used by nodes (e.g., sensors or actuators) may not have, or may not be capable of having, security capabilities. A security layer or buffer may be implemented by nodes that receive or rely on data captured by unsecured sensors. Sensors or other nodes may be dynamically connected or disconnected from a group or architecture. A security layer or buffer may be modular and quickly scalable meet node growth/contraction requirements.

A physical layer may link nodes of architecture 100. The physical layer may provide communication pathways to move data between multiple sub-networks and nodes. Such communication pathways may be wired or wireless. Exemplary wireless communication pathways may include Bluetooth, Wi-Fi, 3G, 4G, 5G and any other suitable wired or wireless broadband standards.

Security on an IoT network may be provided by diverting sensitive data onto distinct communication pathways. For example, a node may be configured to communicate sensitive data using its dedicated network access port. The dedicated network access port may be linked to a communication pathway that is more secure than a communication pathway linked to the nodes pass-through network access port. Other nodes or hardware may secure the communication pathway linked to the dedicated network access pathway.

Figure 2:
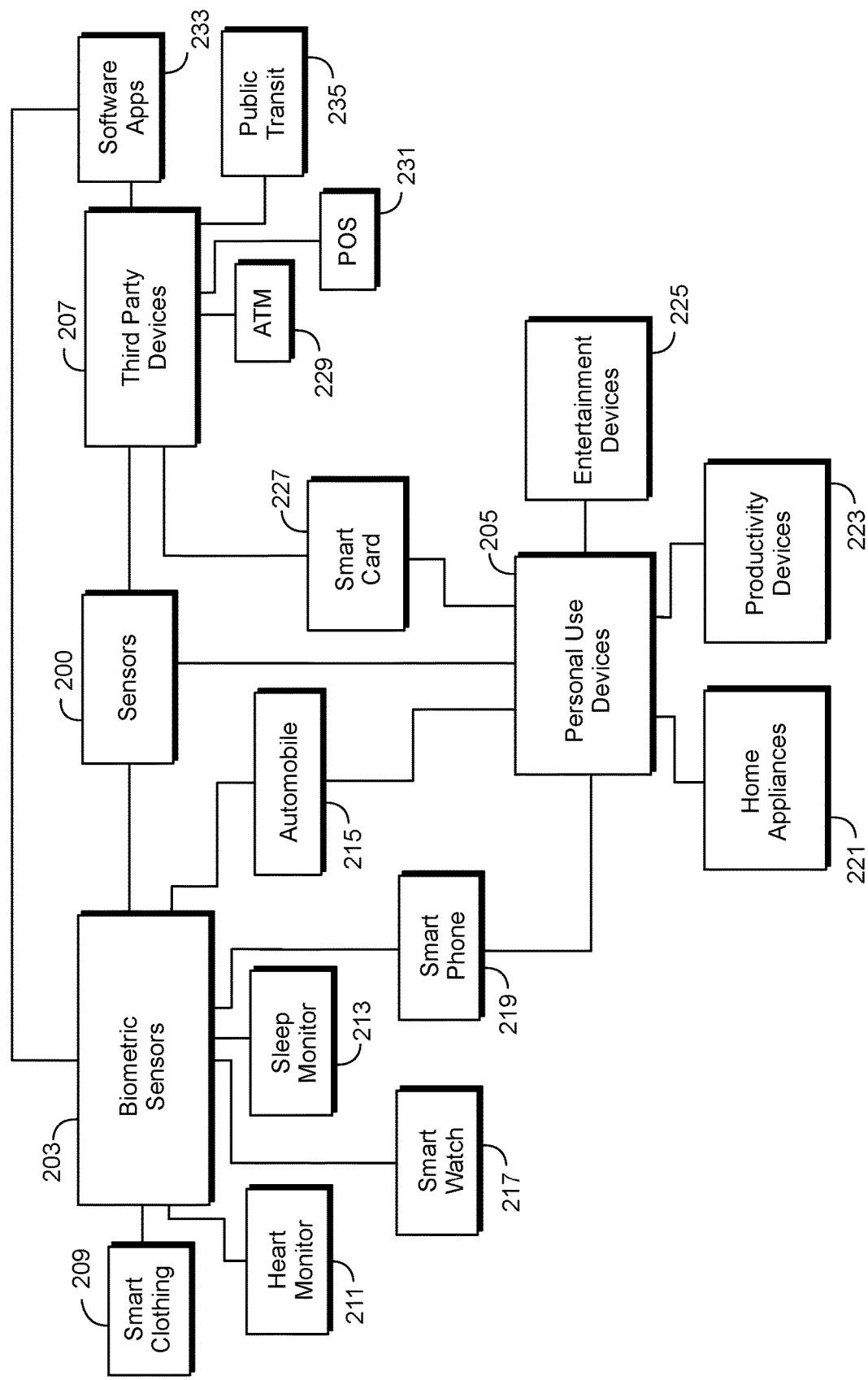
FIG. 2 shows an illustrative arrangement of interconnected nodes in accordance with principles of the disclosure.

FIG. 2 shows illustrative nodes 200. Nodes 200 may include or more features of sensors 103 (shown in FIG. 1). Each of nodes 200 may include a dedicated network access port and a pass-through network access port.

Nodes 200 include biometric sensors 203 that sense biometric attributes. For example, biometric sensors may be embedded in "smart" clothing 209 that monitor a wearer's physical condition. Such clothing may capture biometric data, such as pulse rate, temperature, perspiration levels, muscle contraction, heart rhythm and/or physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 217, smart phone 219 and automobile 215.

Nodes 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. Third-party devices may include devices whose use is monitored by a third-party. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Illustrative purchasing instruments may include a credit card, debit card and other electronic purchasing devices. Such purchasing instruments may sense a location or frequency of use.

Purchasing instruments may include "EMV" chips. EMV is a technology that derives its name from the companies (Europay, MasterCard, and Visa) that developed the technology standard. When a purchasing instrument and its associated EMV chip are inserted into a specialized card reader such as point-of-sale terminal ("POS") 231, the reader powers the EMV chip and the EMV chip generates a new authorization code each time the purchasing instrument is used. The EMV chip may capture transaction data such as transaction amount, transaction location or identity of the POS.

Third-party sensors 207 include ATM 229, POS 231 and public transit 235. ATM 229 and POS 231 may also be actuators. Third-party devices may also include software applications 233. Applications 233 may be used to access services, such as an online banking portal ("OLB"). Such applications may detect and validate biometric features submitted to gain access to an OLB. Third-party devices 207 may include sensors that capture data associated with power consumption (e.g., smart grids), electronic communication traffic, logistics (package movement) or any other suitable environmental condition.

FIG. 200 shows that sensors may categorically overlap. For example, software application 233 used to access an OLB may interact with biometric sensors 203 (e.g., fingerprint reader) to authenticate a user. Automobile 215 may be in regular communication with personal use devices 215 and biometric sensors 203.

Each of the nodes shown in FIG. 200 may include different and possibly incompatible hardware. For example, sensors may each have different operating systems (or none at all), processor types and memory requirements. Nodes 200 may be inexpensive, single-function devices with rudimentary network connectivity. Nodes 200 may be positioned in remote and/or inaccessible locations where human intervention or configuration is difficult.

To conserve power, nodes 200 may utilize 16-bit microcontrollers. Such microcontrollers may use less than 400 micro watts ("µW") per MIPS ("million instructions per second") and may be capable of operating TCP/IPv6 stacks with 4 kilobyte ("kB") RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate and incompatible features of nodes 200, security solutions disclosed herein may be used to verify an authenticity of a sensor and/or data transmitted by a node.

Figure 3:
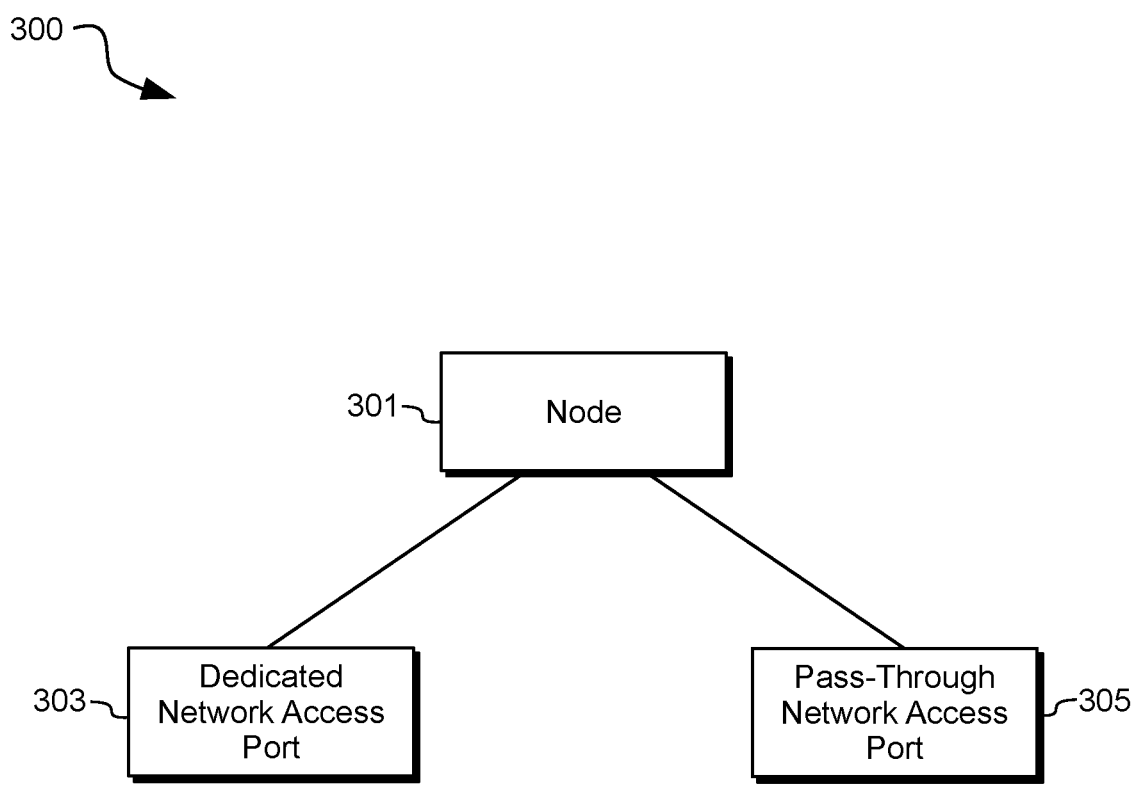
FIG. 3 shows illustrative apparatus in accordance with principles of the disclosure.

FIG. 3 shows illustrative network node 300. Node 300 may be any suitable node, such as exemplary nodes shown in FIGS. 1-2.

Node includes node body 301. Node body 301 may include a processor circuit. The processor circuit may control overall operation of node 301 and its associated components. A processor circuit may include hardware, such as one or more integrated circuits that form a chipset. The hardware may include digital or analog logic circuitry configured to perform any suitable (e.g., logical) operation.

Node body 301 may include RAM, ROM, an I/O module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable node 300 to perform various functions.

Node 300 includes dedicated network access port 303. Node 300 includes pass-through network access port 305. Dedicated and pass-through network access ports 303 and 305 may include specialized hardware and/or software. For example, dedicated network access port 303 may include hardware that provides a first bandwidth capability. Pass-through network access port 305 may include hardware that provides a second bandwidth capability. The first bandwidth capacity may be greater than the second bandwidth capacity.

Network access ports 303 and 305 may include hardware, such as processors, memory and a communication circuit. The communication circuit may include a network interface or adapter. The communication circuit may include a modem, antenna or other circuitry for establishing communications over a network. Network access ports 303 and 305 may provide access to, and communication over, any suitable networks. For example, dedicated network access port 303 may provide a LAN connection and pass-through network access port 305 may provide a WAN connection.

The existence of any of various well-known protocols such as TCP/IP, Ethernet, FTP, HTTP and the like is presumed. Each of network access ports 303 and 305 may be operated in a client-server configuration or peer-to-peer configuration.

Figure 4:
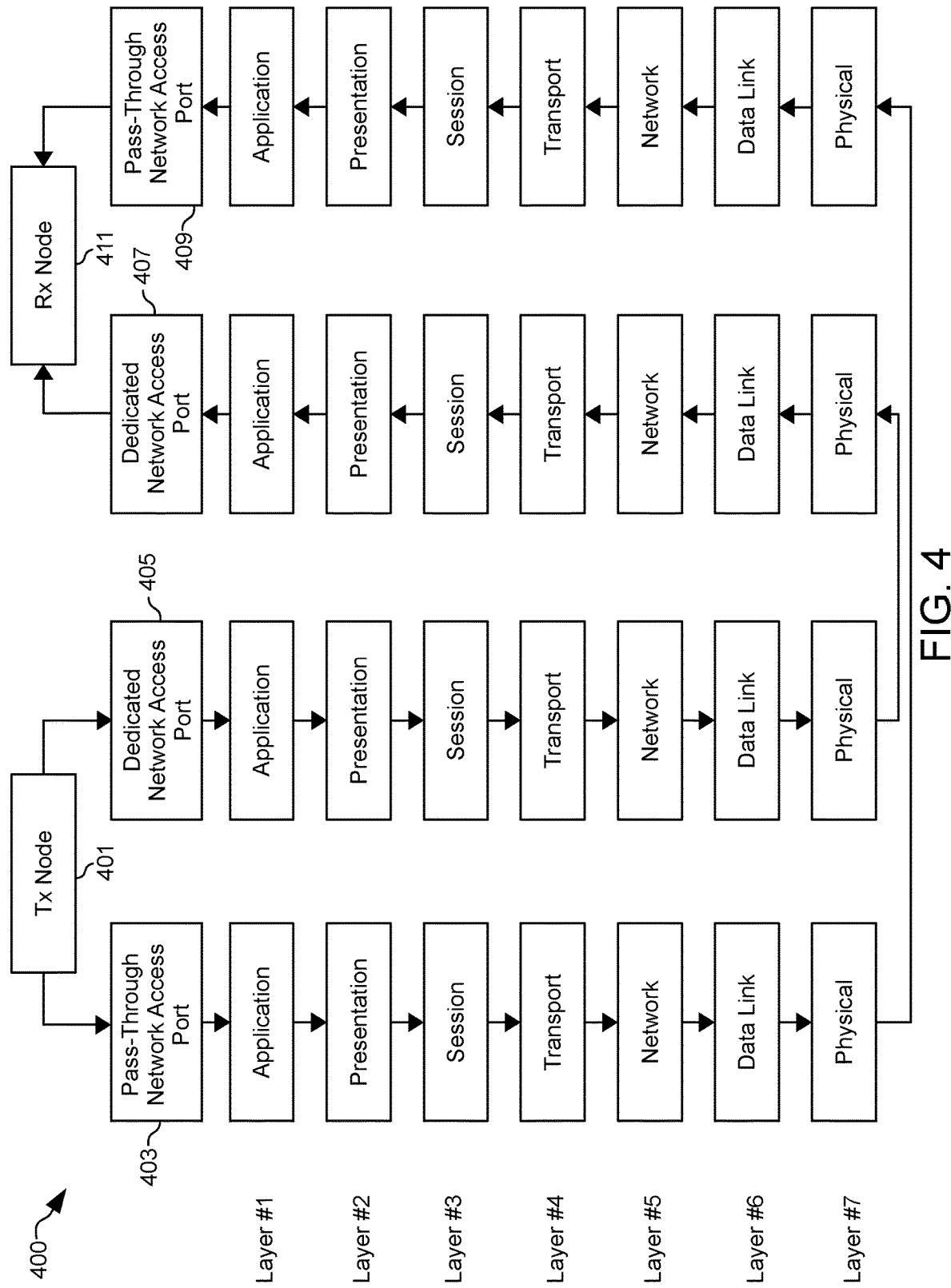
FIG. 4 shows illustrative apparatus in accordance with principles of the disclosure.

FIG. 4 shows illustrative process flow 400. Process flow 400 shows illustrative layers associated with network communications of nodes 401 and 411. Nodes 401 and 411 may include one or more features of nodes shown in FIGS. 1-3.

Process flow 400 shows that network communications may be divided into seven layers. Each layer may be associated with hardware/software to implement the function that layer. The seven illustrative layers may correspond to the Open System Interconnection ("OSI") model. The OSI model defines a conceptual networking framework developed by the International Standards Organization ("ISO") and is codified under International Standard ISO/IEC 7498-1 entitled Information Technology—Open Systems Interconnection—Basic Reference Model: The Basic Model. ISO/IEC 7498-1 is incorporated by reference herein in its entirety.

Application layer #1 supports applications and other end-user processes. The application layer may provide services such as file transfer, email and web browsers.

Presentation layer #2 transforms data into a form that may be understood by (e.g., presented to) the application layer. Illustrative transformation schemes may include ASCII, TIFF, JPEG and MPEG.

Session layer #3 coordinates connections between transmitting and receiving presentation layers over a network. Layer #3 may provide communication control services such as token management, full-duplex mode and half-duplex mode. Layer #3 may provide services that establish a connection between two presentation layers, support orderly data exchanges between the presentation layers and control release of the presentation connection in an orderly manner.

Transport layer #4 provides transparent transfer of data between session layers and relieves the session layers of any concern with the detailed way in which reliable and efficient data transfer is achieved.

Network layer #5 provides switching and routing for transmitting data from node to node. Layer #5 may provide logical communication pathways for data carried by an IoT network. Layer #5 may also address addressing, error correction, traffic control and data packet sequencing. Layer #5 may control transmission of data onto specific networks or sub-networks.

Data link layer #6 may control how nodes on a network access data carried by the network. For example, layer #6 may direct data to a network access port or control which network is accessed by a network access port. Layer #6 may detect errors in transmitted/received data and may establish and control a level of quality-of-service ("QoS"). QoS may be defined for network, node or network access port.

Illustrative QoS parameters may include average time between detected and unrecoverable errors, transit delay and end-to-end throughput. Illustrative layer #6 services include IEEE 802.5 ("Token Ring") 802.2 ("Logical Link Control") and 802.3 ("Ethernet") standards, which are all hereby incorporated by reference herein in their entireties.

Physical layer #7 provides a communication pathway in a physical media for transmission of data. The physical media may carry electrical impulses, optical signals or mechanical signals.

FIG. 400 shows that transmitting node 401 includes pass-through network access port 403 and dedicated network access port 405. FIG. 400 shows that each network access port of transmitting node 401 includes its own independent process flow through layers of the OSI model.

Information transmitted by dedicated network access port 405 may be isolated from information transmitted by pass-through network access port 403. Isolating information transmitted by each network access port may allow differing levels of security such as encryption (or lack thereof) to be independently applied to the information transmitted by each of network access ports 403 and 405.

For example, information transmitted by dedicated network access port 405 may be subjected to more rigorous encryption and may be processed by different applications within transmitting node 401. Transmitting node 401 may utilize dedicated network access port 405 when communicating sensitive information or when communicating with a network or logical communication pathway that processes sensitive information.

As a further example, FIG. 4 shows that each of network access ports 403 and 405 may be associated with its own physical layer. A physical layer may provide hardware for sending/receiving data over a network.

Different physical layers may be subject to different levels of security. Illustrative physical communication pathways may include wired and wireless channels. A physical communication pathway connected to dedicated network access port may be subject to more rigorous encryption and security precautions.

For example, a number of nodes that are permitted to access a physical communication pathway may be limited. Nodes may be required to undergo a vetting process before they are permitted to access the physical communication pathway. The vetting process may ensure that nodes connected to a physical communication pathway are "trusted" to adequately safeguard sensitive data transmitting over a physical communication pathway. Transmitting node 401 may utilize the physical communication pathway connected to dedicated network access port 405 when communicating sensitive information.

Utilizing network access ports 403 and 405, transmitting node 401 may maintain a connection to two different networks or physical communication pathways. A node, such as transmitting node 401 may include two or more pass-through network access ports 403. A node, such as transmitting node 401 may include two or more dedicated network access ports 405.

Process flow 400 shows transmitting node 401 relaying data to receiving node 411. Receiving node 411 includes dedicated network access port 407. In process flow 400, data transmitted by dedicated network access port 405 of transmitting node 401 is received by dedicated network access port 407 of receiving node 411. In other embodiments, data transmitted by dedicated network access port 405 of transmitting node 401 may be received by pass-through network access port 409 of receiving node 411.

Receiving node 411 includes pass-through network access port 409. In process flow 400, data transmitted by pass-through network access port 403 of transmitting node 401 is received by pass-through network access port 409 of receiving node 411. In other embodiments, data transmitted by pass-through network access port 403 may be received by dedicated network access port 407.

In some embodiments, a dedicated network access port may be configured to carry "one time messaging." One time messaging may include critical data destined for a node. A dedicated network access port may be connected to a communication pathway (physical or virtual) dedicated for transmission of one time messaging.

In some embodiments, a pass-through network access port may be configured to carry a continuous feed of a node's needed data and relay such data needed by other nodes. A continuous data stream may include data that controls overall operation of an IoT network. Such data may include feedback from nodes, instructions to actuators/sensors, analyses of data gathered by nodes on the IoT, data traffic control or other suitable data.

A continuous data stream may be carried by a communication pathway (physical or virtual) dedicated for transmission of the continuous data stream. A communication pathway that carries the continuous data stream may have a bandwidth greater than a bandwidth associated with a communication pathway that carries one time messaging.

In some embodiments, a communication pathway associated with a first network access port may be isolated layer from a communication pathway associated with a second network access port. For example, a node may not be allowed to initiate reading/writing to the continuous data stream directly. If a node wishes to correct data in the continuous data stream, the node may need to request an authorization string from a network gateway or other suitable node.

The network gateway may provide the node authorization to read/write to the continuous data stream. The authorization may limit an ability of the node to the specific requested change. The change may be pushed on to the continuous data stream via another node to ensure the node submitting the change did not create a Man-In-The-Middle ("MITM") attack.

Figure 5:
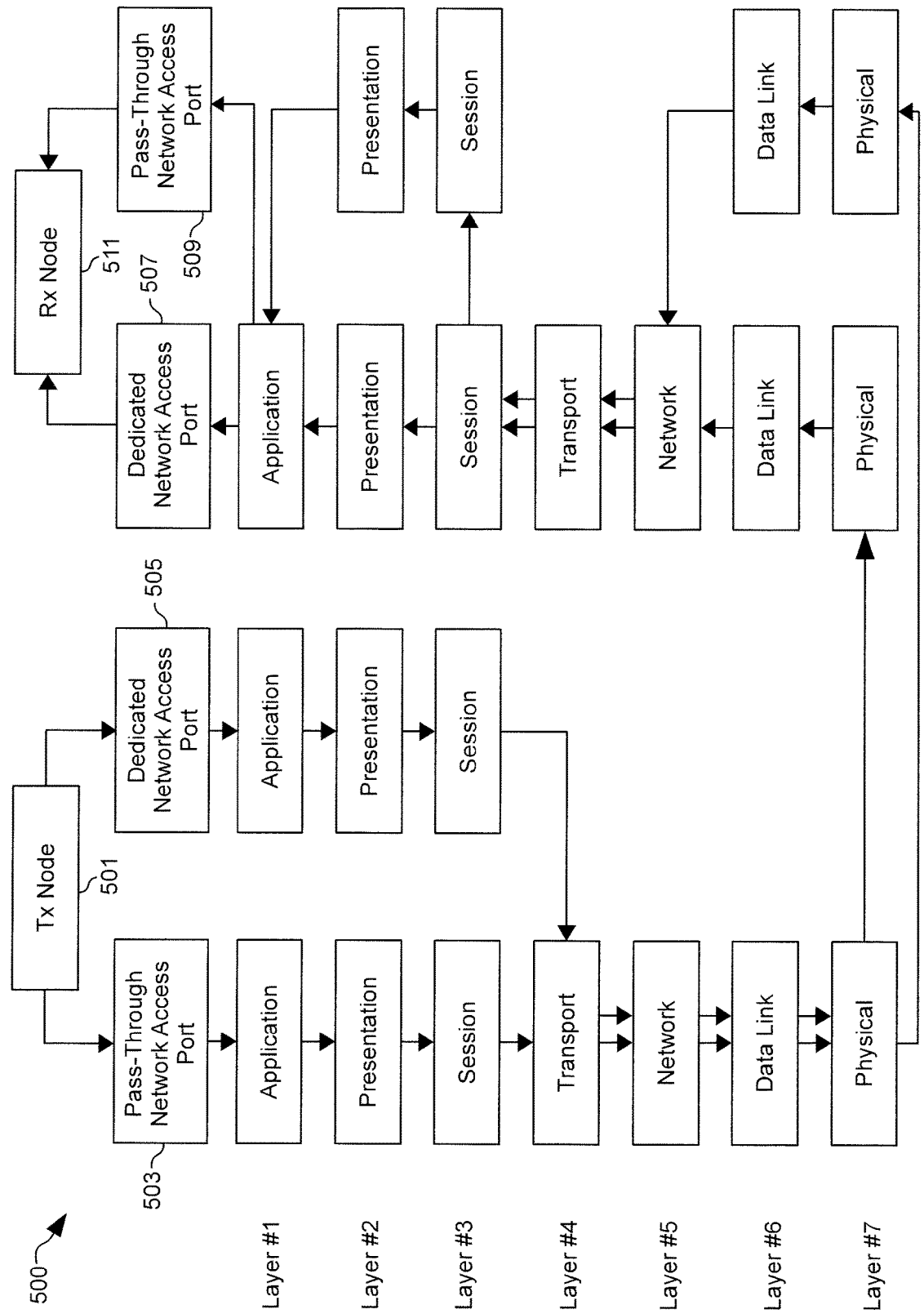
FIG. 5 shows an illustrative apparatus in accordance with principles of the disclosure.

FIG. 5 shows illustrative process flow 500. Process flow 500 shows illustrative layers associated with data network communications of nodes 501 and 511. Nodes 501 and 511 may include one or more features of nodes shown in FIGS. 1-4. Process flow 500 shows that processing of network communications may be divided into seven layers. Process flow 500 also shows that services provided by each of the seven layers may be shared by network access ports 503 and 505 of transmitting node 501. Process flow 500 also shows that services provided by each of the seven layers may be shared by network access ports 507 and 509 of receiving node 511.

For example, FIG. 5 shows that network access ports 503 and 505 may have their own, independent layer 1-3 services. FIG. 5 also shows that network access ports 503 and 505 may share services provided by layers 4-7.

FIG. 5 also shows that network access ports 507 and 509 of receiving node 511 may each have their own, independent layer 6-7 and layer 2-3 services. FIG. 5 also shows that network access ports 507 and 509 of receiving node 511 may share services provided by layers 4 and 1.

Layer independence and sharing shown in FIG. 5 is illustrative. Any suitable combination of layer independence/sharing is contemplated. Combinations of layer independence/sharing may vary based on a purpose of data transmitted/received, a sensitivity of data transmitted/received, a network on which a node is positioned, a time when data is transmitted/received, physical location of a node or any suitable consideration.

For example, when transmitting/receiving highly confidential or sensitive data, dedicated network access ports 505 and 507 may utilized wholly independent layers 1-7 (as shown in FIG. 4 with respect to dedicated network access ports 405 and 407).

Figure 6:
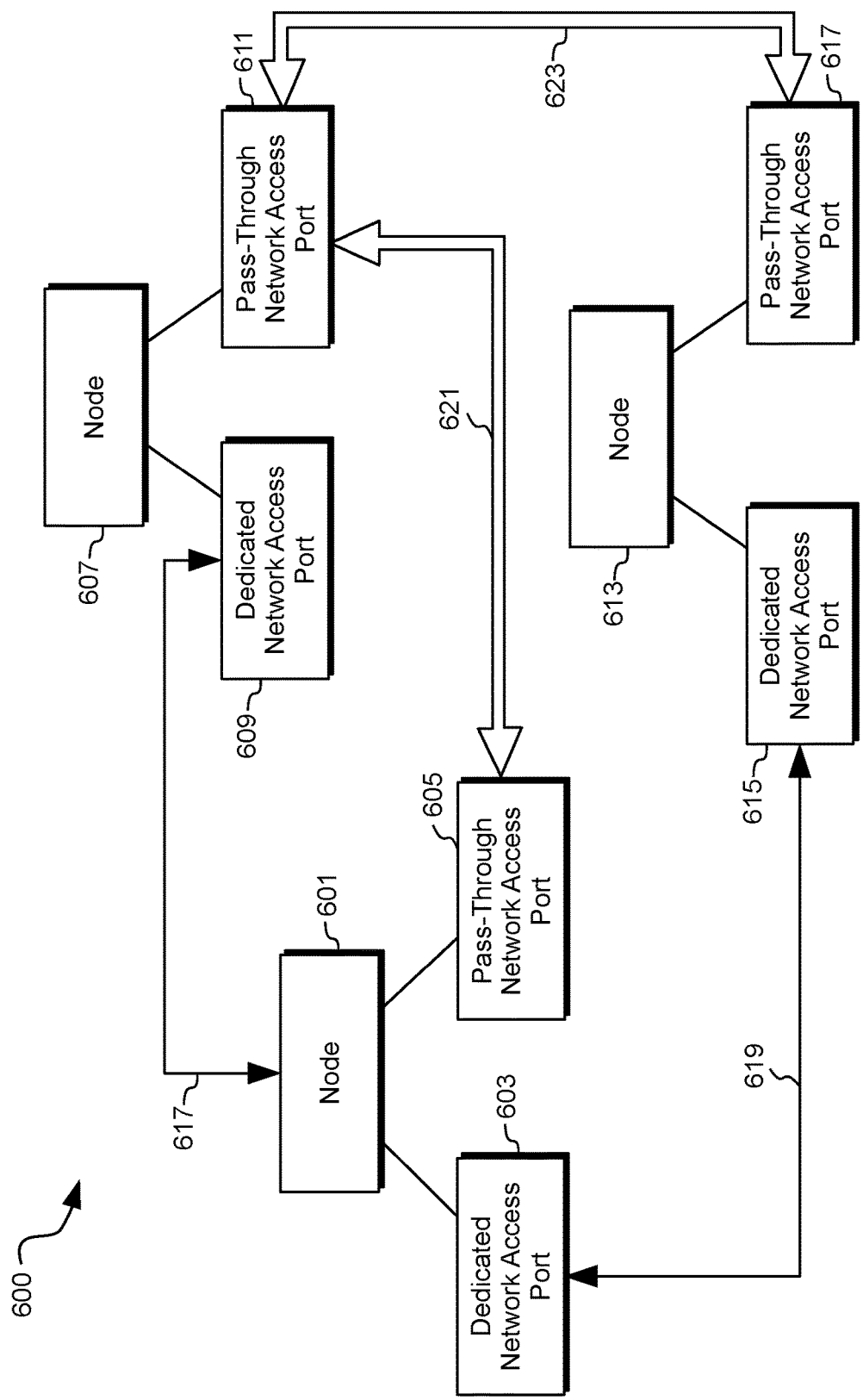
FIG. 6 shows an illustrative scenario in accordance with principles of the disclosure.

FIG. 6 shows illustrative arrangement 600. Arrangement 600 includes nodes 601, 607 and 613. Node 601 includes dedicated network access port 603 and pass-through network access port 605. Node 607 includes dedicated network access port 609 and pass-through network access port 611. Node 613 includes dedicated network access port 615 and pass-through network access port 617.

Arrangement 600 shows that dedicated network access ports 603, 609 and 615 may communicate over communication pathways 617 and 619. Communication pathways 617 and 619 may be part of a single network. Communication pathway 617 may be part of a first network. Communication pathway 619 may be part of a second network.

Arrangement 600 shows that pass-through network access ports 605, 611 and 617 may communicate over communication pathways 621 and 623. Communication pathways 621 and 623 may be part of a single network. Communication pathway 621 may be part of a first network. Communication pathway 623 may be part of a second network.

Communication pathways 617 and 619 may be more secure than communication pathways 621 and 623. For example, communication pathways 617 and 619 may be wired channels and communication pathways 621 and 623 may be wireless channels. Communication pathways 617 and 619 may be encrypted with a more complex algorithm which requires greater processing power to encrypt/decrypt than encryption provided by communication pathways 621 and 623.

Figure 7:
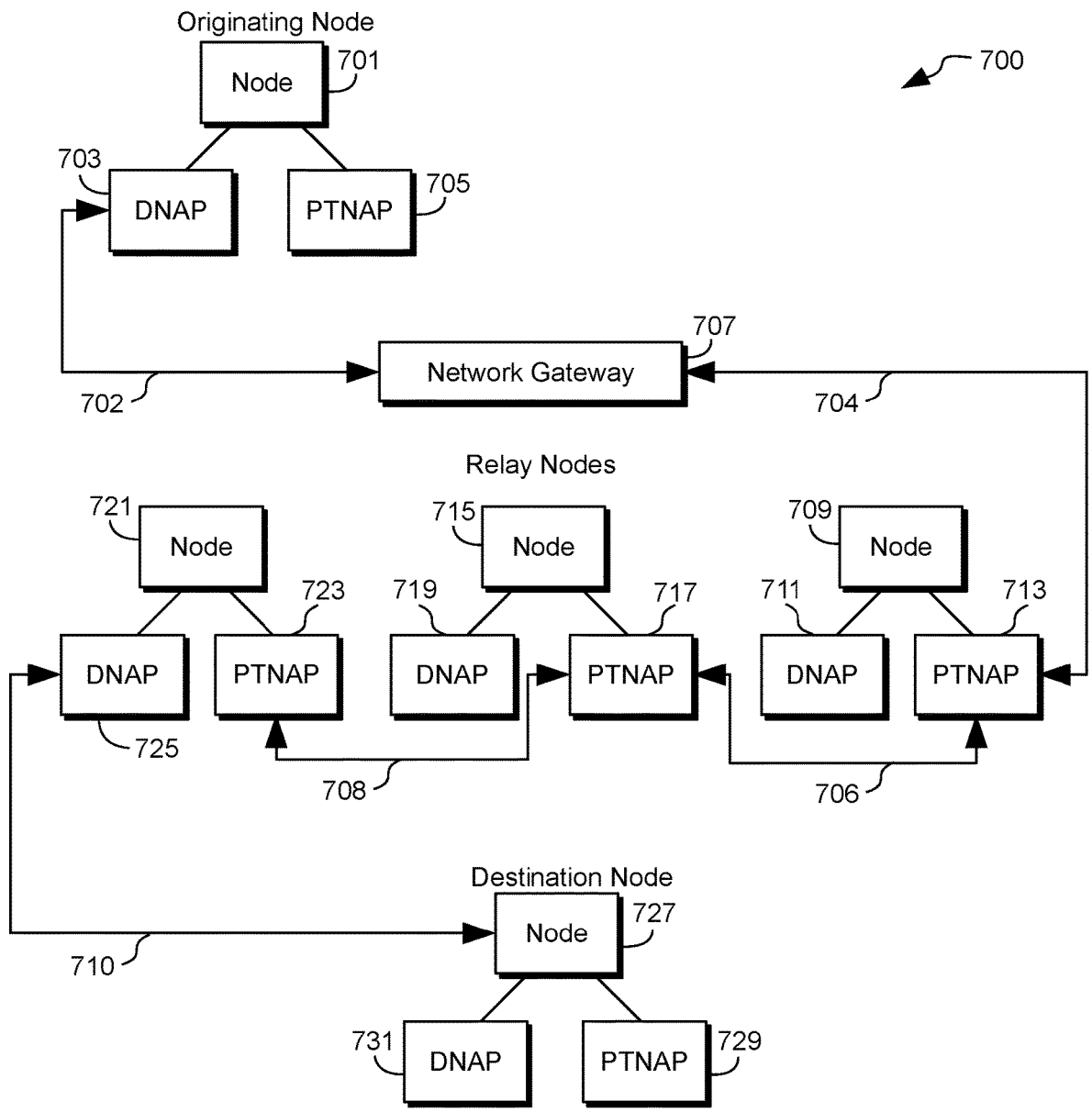
FIG. 7 shows an illustrative scenario in accordance with principles of the disclosure.

FIG. 7 shows illustrative scenario 700. In scenario 700, originating node 701 transmits data using dedicated network access port ("DNAP") 703 Data transmitted using dedicated network access port 703 (e.g., instead of using pass-through network access port 705) may be assigned a high transmission priority, QoS, security or other data transmission attribute.

Scenario 700 shows that data transmitted using dedicated network access port 703 is carried by communication pathway 702 to network gateway 707. At network gateway 707 the data is transmitted via communication pathway 704 to pass-through network access port ("PTNAP") 713 of node 709. Although node 709 also includes dedicated network access port 711, network gateway 707 transmits the data to pass-through network access port 713. Node 709 may reside on a more secure network than node 701. All data carried by node 709 (whether transmitted via network access ports 713 or 711) may be securely transmitted. Using pass-through network access port 713 may provide faster transmission of the data.

Scenario 700 shows that data is received and relayed by node 715 using its pass-through network access port 717 (and not its dedicated network access port 719) via communication pathway 706. Scenario 700 also shows that data is relayed from node 715 to node 721 via communication pathway 708 using pass-through network access ports 717 and 723 (and not dedicated network access ports 719 and 725).

Scenario 700 shows that node 721 transmits data via communication pathway 710 to destination node 727. Node 721 relays the data using dedicated network access port 725 (and not pass-through network access port 723). Node 727 receives the data using dedicated network access port 731 (and not pass-through network access port 729). Node 727 and associated communication pathway 710 may reside on a network that is less secure than communication pathways 708 and 706. Nodes 721 and 727 may utilize their dedicated network access ports (725 and 731) to provide more secure transmission of data than would have otherwise been provided by communication pathway 710.

For example, using dedicated network access ports 725 and 731, specialized network layer services may be applied to data transmitted over communication pathway 710. Specialized network services may include enhanced error correction or security. Data relayed between nodes 721 and 727 using pass-through network access ports 723 and 729 may transmitted using default transmission protocols associated with communication pathway 710. In some embodiments, communication pathway 710 may not be accessible to pass-through network access ports 723 and 729.

Thus, apparatus and methods for nodes on an IoT with dual-network access ports have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A network node for electronic communication with at least one other node on an Internet-of-Things ("IoT") network, the network node comprising:

a dedicated network access port for receiving and transmitting time-sensitive instructions at discrete intervals; and a pass-through network access port for receiving, at any time, data destined for at least one other node on the IoT network and relaying the data destined for the at least one other node; wherein:

in response to detecting an error in the data received by the pass-through network access port, the node is configured to:

formulate a proposed correction to the data received by the pass-through port;

submit the proposed correction to a network gateway;

receive authorization from the network gateway to transmit the proposed correction to the at least one other node; and via the dedicated network access port, transmit the proposed correction and the authorization to the at least one other node; and in response to receiving the proposed correction and the authorization, the at least one other node is configured to:

verify the authorization by communicating with the network gateway; and in response to verifying the authorization, push the proposed correction onto the IoT network via its dedicated network access port, wherein the proposed correction comprises message header information that ensures the proposed correction data is received by pass-through network access ports of nodes on the IoT network.

2. The network node of claim 1, wherein:
the dedicated network access port has a first internet protocol ("IP") address; and
the pass-through network access port has a second IP address.

3. The network node of claim 1 wherein:
the dedicated network access port has a first bandwidth capability; and
the pass-through network access port has a second bandwidth capability.

4. The network node of claim 1, wherein:
the dedicated network access port is capable of receiving or transmitting data; and
the pass-through network access port only receives data.

5. The network node of claim 4, wherein:
the dedicated network access port is configured to read and write to a first data transmission channel; and
the pass-through network access port is configured to read to a second data transmission channel.

6. The network node of claim 5 wherein, the pass-through network access port is configured to write data to the second data transmission channel in response to obtaining prior authorization from the network gateway on the network.

7. The network node of claim 5 wherein, the pass-through network access port is configured to write data to the first data transmission channel in response to obtaining prior authorization from the network gateway on the network.

8. Apparatus for improving the flow of electronic information on an Internet-of-Things ("IoT") network, the IoT network comprising a plurality of nodes, each node having a dedicated network access port and a pass-through network access port;
wherein:
the pass-through network access port of a node:
receives data addressed to other nodes on the network and retransmits the received data; and
does not allow the node to change the data received by the pass-through network access port; and
the dedicated network access port of the node:
receives data addressed to the node; and
transmits data generated by the node; and
wherein:
in response to detecting an error in the data received by the pass-through network access port, the node is configured to:
formulate a proposed correction to the data received by the pass-through port;
submit the proposed correction to a network gateway;

receive authorization from the network gateway to transmit the proposed correction to other nodes on the network; and via the dedicated network access port, transmit the proposed correction and the authorization to another node on the network; and in response to receiving the proposed correction and the authorization, the other node is configured to:

verify the authorization by communicating with the network gateway; and in response to verifying the authorization, push the proposed correction onto the network via the dedicated network access port, wherein the proposed correction comprises message header information that ensures the proposed correction data is received by the pass-through network access ports of each of the plurality of nodes on the IoT network.

9. The apparatus of claim 8 wherein, transmission of data addressed to the dedicated network access port is prioritized by the network over data transmitted by the pass-through network access port.

10. The apparatus of claim 8 wherein, data addressed to the dedicated network access port is encrypted and the data transmitted by the pass-through network access port is not encrypted.

11. The apparatus of claim 8, the network further comprising at least one node having only a pass-through network access port.

12. The apparatus of claim 11, wherein the at least one node having only the pass-through network access port cannot submit a proposed change to data transmitted by the node.

13. The apparatus of claim 8, wherein the pass-through network access port is configured to be deactivated and thereby speed transmission of data transmitted by the dedicated network access port on the IoT network.

14. Apparatus for improving the flow of electronic information through an Internet-of-Things ("IoT") network, the network comprising a plurality of nodes, each node having a dedicated network access port and a pass-through network access port;
wherein:
the pass-through network access port of a node receives data addressed to other nodes on the network and retransmits the received data;
the dedicated network access port of the node:
receives data finally destined for the node; and
transmits data generated by the node;
the dedicated network access port is configured to be deactivated and thereby speed transmission of data received and/or transmitted by pass-through network access ports of the plurality of nodes;
in response to detecting an error in the data received by the pass-through network access port, the node is configured to:
formulate a proposed correction to the data received by the pass-through port;
submit the proposed correction to a network gateway;
receive authorization from the network gateway to transmit the proposed correction to the other nodes on the network; and
via the dedicated network access port, transmit the proposed correction and the authorization to at least one other node on the network; and in response to receiving the proposed correction and the authorization, the at least one other node is configured to:

verify the authorization by communicating with the network gateway; and in response to verifying the authorization, push the proposed correction onto the network via its dedicated network access port, wherein the proposed correction comprises message header information that ensures the proposed correction data is received by the pass-through network access ports of each of the plurality of nodes on the IoT network.

15. The apparatus of claim 14, wherein the pass-through network access port is a first pass-through network access port, and the dedicated network access port is convertible into a second pass-through network access port.

16. The apparatus of claim 15 wherein the second pass-through network access port is activated when the node is connected to a continuous power source.

17. The apparatus of claim 14 wherein the dedicated network access port is a first dedicated network access port, and the pass-through network access port is convertible into a second dedicated network access port.

18. The apparatus of claim 14 wherein:
the dedicated network access port communicates over a wireless channel; and
the pass-through network access port communicates over a wired channel.

* * * * *